US012503123B2

(12) United States Patent
Brandon

(10) Patent No.: US 12,503,123 B2
(45) Date of Patent: Dec. 23, 2025

(54) DETECTION OF SNOW AND ICE ACCUMULATION ON A VEHICLE

(71) Applicant: GM Cruise Holdings LLC, San Francisco, CA (US)

(72) Inventor: Jeffrey Brandon, Phoenix, AZ (US)

(73) Assignee: GM CRUISE HOLDINGS LLC, San Francisco, CA (US)

(*) Notice: Subject to any disclaimer, the term of this patent is extended or adjusted under 35 U.S.C. 154(b) by 315 days.

(21) Appl. No.: 18/345,136

(22) Filed: Jun. 30, 2023

(65) Prior Publication Data

US 2025/0002025 A1 Jan. 2, 2025

(51) Int. Cl.
B60W 40/13 (2012.01)
G01B 11/06 (2006.01)
G01G 19/12 (2006.01)
G06T 7/60 (2017.01)

(52) U.S. Cl.
CPC ......... B60W 40/13 (2013.01); G01B 11/0616 (2013.01); G01G 19/12 (2013.01); G06T 7/60 (2013.01); B60W 2040/1323 (2013.01); G06T 2207/20081 (2013.01); G06T 2207/30252 (2013.01)

(58) Field of Classification Search
CPC ... G01G 19/12; G01B 11/0616; B60W 40/13; B60W 2040/1323
See application file for complete search history.

(56) References Cited

U.S. PATENT DOCUMENTS

| 11,594,017 | B1* | 2/2023 | Gupta | G01S 15/931 |
| 11,897,478 | B2* | 2/2024 | Stenneth | B60W 40/02 |
| 2008/0272906 | A1* | 11/2008 | Breed | B60R 21/01538 340/539.11 |
| 2015/0203107 | A1* | 7/2015 | Lippman | B60W 30/00 701/23 |
| 2016/0327687 | A1* | 11/2016 | Nylander | G01W 1/14 |
| 2018/0079424 | A1* | 3/2018 | Myers | B60W 30/02 |
| 2018/0141563 | A1* | 5/2018 | Becker | G01C 21/3655 |
| 2022/0075025 | A1* | 3/2022 | Kardassakis | G01S 13/931 |
| 2023/0182742 | A1* | 6/2023 | Han | B60W 40/02 701/23 |
| 2024/0109515 | A1* | 4/2024 | Diamond | B60H 1/00785 |
| 2025/0001979 | A1* | 1/2025 | Brandon | B60H 1/00785 |

* cited by examiner

Primary Examiner — Natalie Huls
(74) Attorney, Agent, or Firm — CANTOR COLBURN LLP

(57) ABSTRACT

Systems and methods for detecting snow and ice accumulation on a vehicle. In particular, systems and methods are provided for utilizing on-board sensors to automate the process of detecting snow and ice accumulation on surfaces of an autonomous vehicle. Additionally, systems and methods are provided for utilizing on-board sensors to monitor snow and ice accumulation on surfaces of an autonomous vehicle. Automating the detection and monitoring of snow and ice accumulation on a vehicle can minimize physical inspections and unnecessary interruptions to vehicle operation in wintry conditions.

18 Claims, 7 Drawing Sheets

DETECTION OF SNOW AND ICE ACCUMULATION ON A VEHICLE

BACKGROUND

1. Technical Field

The present disclosure generally relates to vehicle sensors and, more specifically, to sensing snow and/or ice accumulation on a vehicle.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1A:
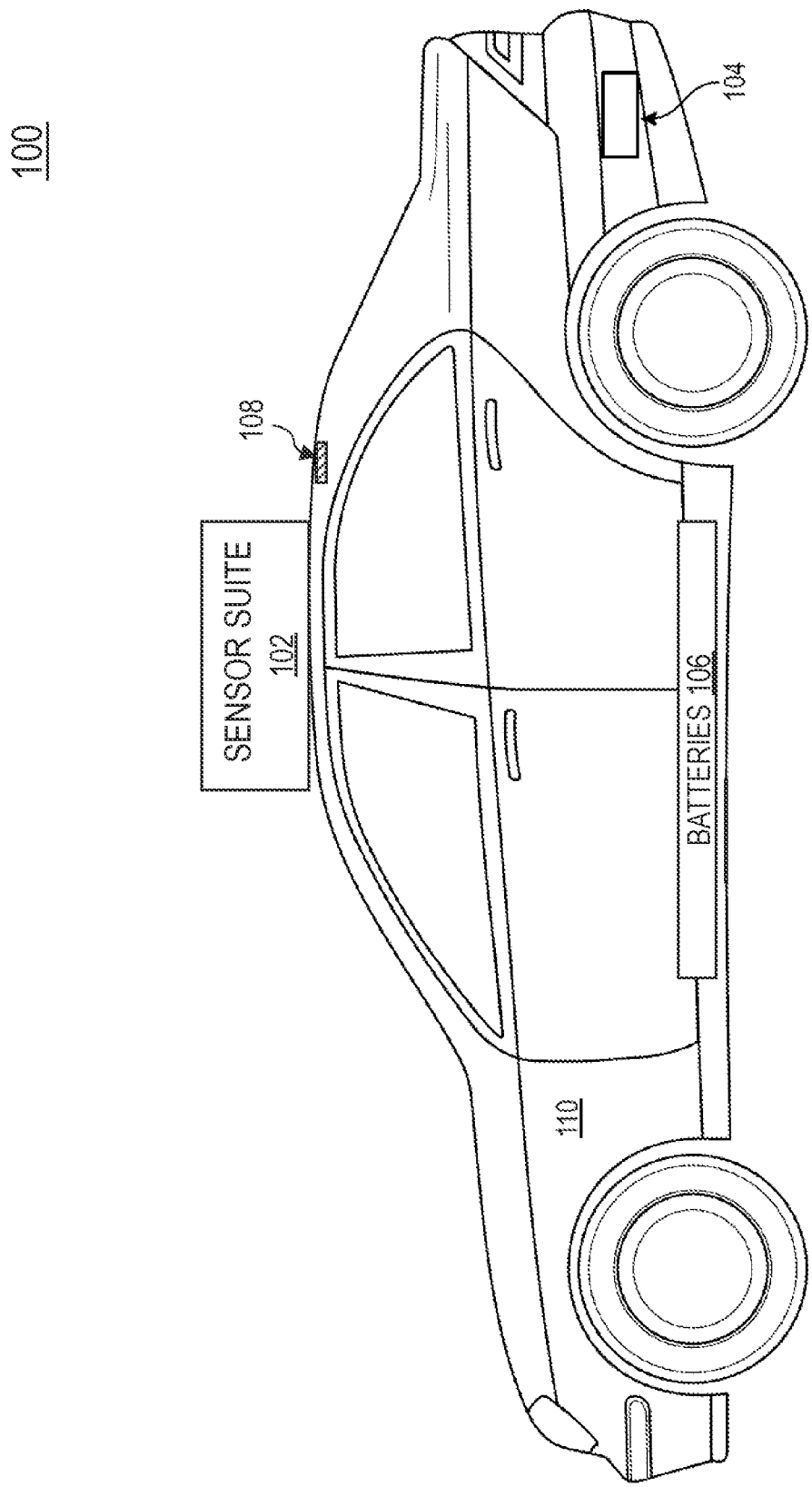
FIGS. 1A-1B illustrate vehicles for detection of ice and snow accumulation, according to some examples of the present disclosure.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

Overview

Systems and methods are provided for detecting snow and ice accumulation on a vehicle. In particular, systems and methods are provided for utilizing on-board sensors to automate the process of detecting snow and ice accumulation on surfaces of an autonomous vehicle. Additionally, systems and methods are provided for utilizing on-board sensors to monitor snow and ice accumulation on surfaces of an autonomous vehicle. Automating the detection and monitoring of snow and ice accumulation on a vehicle can minimize physical inspections and unnecessary interruptions to vehicle operation in wintry conditions.

In cold climates, vehicles are often exposed to situations where snow and/or ice accumulate on the surface of the vehicle and on vehicle sensors. Generally, a person can clear off the vehicle surfaces and/or sensors before driving. However, autonomous vehicles do not have a driver, and autonomous vehicle fleets can operate many autonomous vehicles with minimal interaction from fleet personnel. While personnel can be deployed to clear vehicles of ice and snow, in some cases only a portion of fleet vehicles may need to be cleared. In various examples, determining which vehicles have snow and/or ice accumulation on vehicle surfaces and/or sensors can help minimize manual labor for inspecting and/or clearing off the vehicles prior to vehicle deployment during and/or after a wintry event. Thus, automating the process of detecting snow and/or ice accumulation can improve operational efficiency of an autonomous vehicle fleet.

Used herein, ice may include snow (e.g., comprising ice crystals), frozen water, water that is frozen into a solid state, water in crystalline form, water in amorphous solid state, and water in solid form at or below 0 degrees Celsius. In some cases, ice may include ice in solid form and some water in liquid form. Ice may include water and other impurities.

Additionally, monitoring for snow and ice accumulation on a vehicle surface during operation allows for vehicles to return to a facility for cleaning when snow and ice accumulation is detected, rather than on a set schedule. In this manner, monitoring for snow and ice accumulation on a vehicle surface eliminates unnecessary interruptions to ride-hail and delivery operations. Furthermore, some cities and/or states have regulations regarding vehicles driving with snow and ice on vehicle surfaces, and methods for autonomously monitoring for snow and ice accumulation on a vehicle surface can be used to ensure compliance with any local regulations.

Thus, systems and methods are provided herein for utilizing vehicle sensors to detect and monitor snow and ice accumulation on a vehicle. Additionally, vehicle communication systems can be used to communicate the presence of snow and ice on a vehicle. Various sensors that can be used to detect and monitor snow and ice accumulation include thermocouples, light sensors, cameras, microphones, accelerometers, and ultrasonic sensors. For example, a roof-mounted light sensor can be utilized to determine a level of light (lumen) measurement at the top of a vehicle. Similarly, cameras, such as autonomous vehicle perception cameras, can be used to determine a level of light measurement around the vehicle. In some examples, external mounted microphones can be used in conjunction with an acoustic processing module to detect and process sound, where attenuation of sound at the microphone can indicate snow and/or ice present on the surface at the microphone. In further examples, ultrasonic sensors can be used to detect snow and/or ice accumulation on the surface of the vehicle. Ultrasonic sensors can be used to detect near-range objects. Near-range objects can include objects that are less than two meters from the ultrasonic sensor. In some examples, one or more thermocouples can be used to determine a temperature, and a temperature measurement can be used to identify conditions in which snow and/or ice may be present. Similarly, a temperature measurement can be used to rule out the possibility of snow and/or ice causing various conditions at other sensors.

In some examples, accelerometers can be embedded into the body panels, fascias, and in features protruding from the vehicle. The accelerometers can detect acceleration at different points in the vehicle indicating added mass of snow and/or ice on the vehicle. The accelerometers can be installed around the vehicle body to collect acceleration information. The accelerometer data can be processed using digital signal processing techniques as well as with machine learning techniques to enhance the signals and extract features. Extracted features can include spectra shape and peak G feature. In various examples, the extracted features can be used to detect the added mass of snow and/or ice on the surfaces of the vehicle. In some implementations, data from embedded accelerometers and the IMU can be used to ascertain chassis response that signals the additional weight of snow and/or ice carried on the vehicle.

In some examples, sensor measurements across a local fleet can be averaged to determine a baseline average, such as an average of light measurements and/or an average of mass measurements. Then, sensor measurements at a particular vehicle can be compared to the baseline average to determine the relative magnitude of snow and/or ice accumulation for an individual vehicle.

In various implementations, systems and methods are provided for fusion of sensor data from embedded accelerometers, cameras, light sensors, microphones, ultrasonic detectors, and the inertial measurement unit (IMU) to identify the position and level of snow and ice accumulation on a vehicle. Additionally, machine learning models can be leveraged to determine the extent of snow and ice accumulation. In some examples, machine learning models can be used to improve accuracy of the determination of snow and ice accumulation.

Additionally, vehicle communication modules can be utilized to communicate instances of snow and ice accumulation. In particular, a vehicle perception module or a vehicle sensor stack signals to a wireless communication module the instance of snow and ice accumulation on the vehicle, the position of snow and ice accumulation on the vehicle, and the level of snow and ice accumulation on the vehicle. The onboard wireless communication module communicates the identification of snow and ice on the vehicle with a central computer (or back office). The central computer (or back office) monitors real time instances and severity of snow and/or ice accumulation across the vehicle fleet. In some examples, the central computer can schedule remediation activity based on the real time instances of snow and/or ice accumulation, and in some examples, the central computer can prioritize remediation activity based on the real time instances of snow and/or ice accumulation.

Example Vehicle for Detection of Ice and Snow Accumulation

Figure 1B:
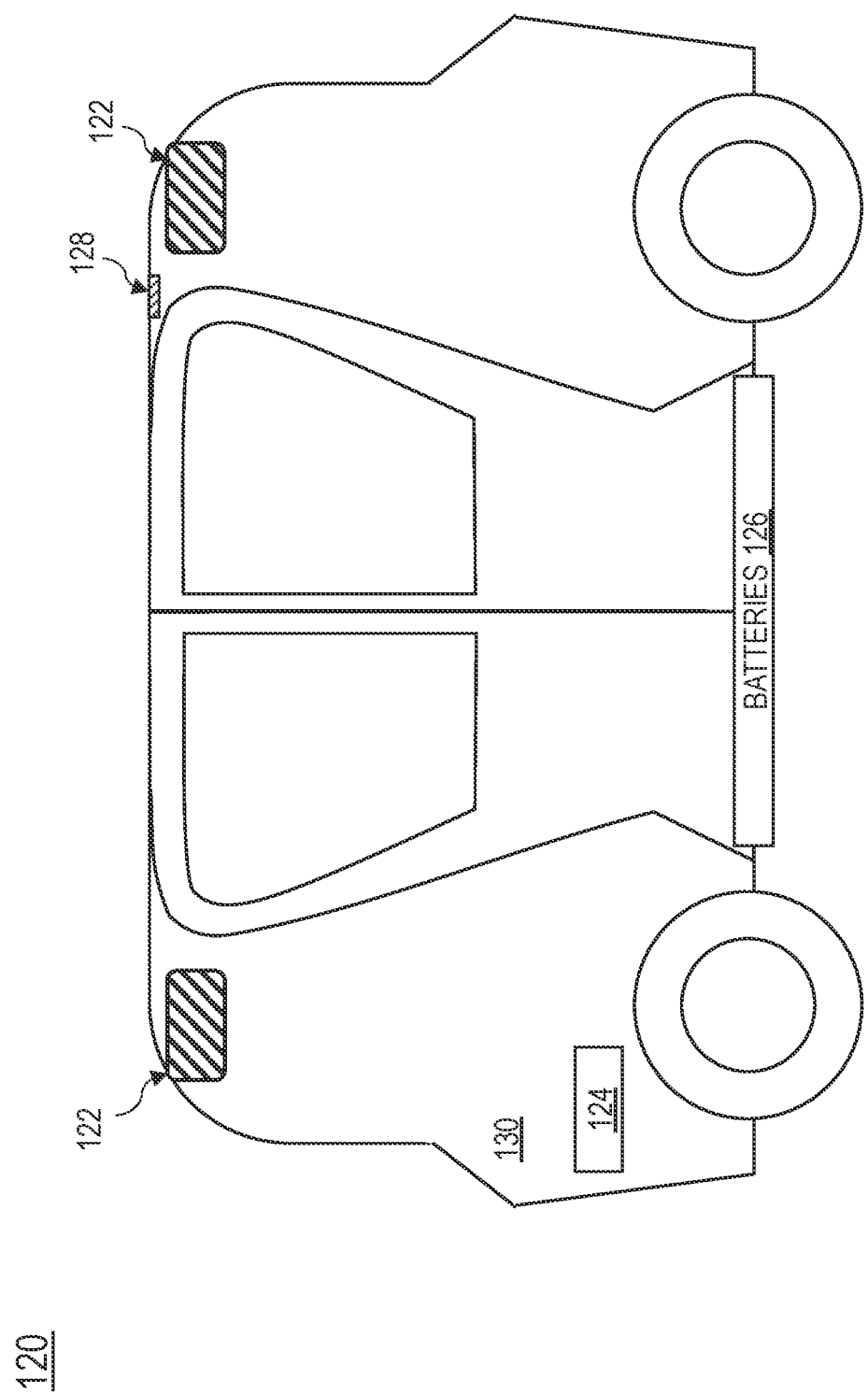

FIGS. 1A-1B illustrate autonomous vehicles 110, 130 for detection of ice and snow accumulation, according to some examples of the present disclosure. The autonomous vehicle 110 includes a sensor suite 102 and an onboard computer 104, and the autonomous vehicle 130 includes sensor suites 122 and an onboard computer 124. In various implementations, the autonomous vehicles 110, 130 uses sensor information from the sensor suites 102, 122 to determine vehicle location, to navigate traffic, to sense and avoid obstacles, and to sense vehicle surroundings. The autonomous vehicles 110, 130 uses sensor information from the sensor suites 102, 122 to detect ice and/or snow accumulation on the vehicles 110, 130. In various examples, the vehicles 110, 130 include additional sensors on the vehicle bodies, such as a rooftop sensor 108, 128. In some examples, the rooftop sensors 108, 128 are ambient light sensors. According to various implementations, the autonomous vehicles 110, 130 are part of a fleet of vehicles for picking up passengers and/or packages and driving to selected destinations. In some examples, the autonomous vehicles 110, 130 are personal autonomous vehicles that are used by one or more owners for driving to selected destinations. In some examples, the autonomous vehicles 110, 130 can connect with a central computer to download vehicle updates, maps, and other vehicle data.

The sensor suites 102, 122 include localization and driving sensors. For example, the sensor suite 102 may include one or more of photodetectors, cameras, RADAR, sound navigation and ranging (SONAR), LIDAR, Global Positioning System (GPS), inertial measurement units (IMUs), accelerometers, microphones, strain gauges, pressure monitors, barometers, thermometers, altimeters, wheel speed sensors, and a computer vision system. The sensor suites 102, 122 continuously monitor the autonomous vehicle's environment. In particular, the sensor suites 102, 122 can be used to identify information and determine various factors regarding an autonomous vehicle's environment. In some examples, data from the sensor suite 102, 122 can be used to update a map with information used to develop layers with waypoints identifying various detected items. Additionally, sensor suite 102, 122 data can provide localized traffic information, ongoing road work information, and current road condition information. Furthermore, sensor suite 102, 122 data can provide current environmental information, including roadside environment or parking area environment information and information about other nearby vehicles when parked, as well as the presence of people, crowds, and/or objects on a roadside, sidewalk, or parking area. In this way, sensor suite 102, 122 data from many autonomous vehicles can continually provide feedback to the mapping system and a high fidelity map can be updated as more and more information is gathered. Additionally, sensor suite 102, 122 data can provide local weather information as well as information about snow and/or ice accumulation on the vehicles 110, 130, respectively. In some examples, the sensor suite 102 includes one or more thermocouples which can be used to measure temperature. A temperature measurement can be used to determine the possibility of snow and/or ice on the vehicle 110, 130.

In various examples, the sensor suites 102, 122 include cameras implemented using high-resolution imagers with fixed mounting and field of view. In further examples, the sensor suite 102, 122 includes LIDARs implemented using scanning LIDARs. Scanning LIDARs have a dynamically configurable field of view that provides a point cloud of the region intended to scan. In still further examples, the sensor suite 102, 122 includes RADARs implemented using scanning RADARs with dynamically configurable field of view. In some examples, the sensor suites 102, 122 can include one or more microphones, ultrasonic sensors, accelerometers, light sensors, and mass sensors.

The autonomous vehicles 110, 130 each include an onboard computer 104, 124 which functions to control the autonomous vehicle 110, 130. The onboard computer 104, 124 processes sensed data from the sensor suite 102, 122 and/or other sensors, in order to determine a state of the autonomous vehicle 110, 130. Additionally, the onboard computer 104, 124 processes sensed data from the sensor suite 102, 122 as well as sensor data from other vehicle sensors to detect snow and ice accumulation on the vehicles 110, 130. In some examples, the onboard computer 104,124 checks for vehicle updates from a central computer or other secure access point. In some examples, a vehicle sensor log receives and stores processed sensed sensor suite 102, 122 data from the onboard computer 104, 124. In some examples, a vehicle sensor log receives sensor suite 102, 122 data from the sensor suite 102, 122. The vehicle sensor log can be used to determine a state of a vehicle and various maintenance items such as charging, cleaning, and potential vehicle damage.

In some implementations described herein, the autonomous vehicles 110, 130 include sensors inside the vehicle. In some examples, the autonomous vehicles 110, 130 include one or more cameras inside the vehicle. The cameras can be used to detect items or people inside the vehicle. In some examples, the autonomous vehicles 110, 130 include one or more weight sensors inside the vehicle, which can be used to detect items or people inside the vehicle. In some examples, the interior sensors can be used to detect passengers inside the vehicle. Additionally, based upon the vehicle state and programmed instructions, the onboard computer 104, 124 controls and/or modifies driving behavior of the autonomous vehicle 110, 130.

The onboard computer 104, 124 functions to control the operations and functionality of the autonomous vehicle 110, 130 and processes sensed data from the sensor suite 102, 122 and/or other sensors in order to determine states of the autonomous vehicle and to detect snow and ice accumulation on the autonomous vehicle 110, 130. In some implementations, the onboard computer 104, 124 is a general purpose computer adapted for I/O communication with vehicle control systems and sensor systems. In some implementations, the onboard computer 104, 124 is any suitable computing device. In some implementations, the onboard computer 104, 124 is connected to the Internet via a wireless connection (e.g., via a cellular data connection). In some examples, the onboard computer 104, 124 is coupled to any number of wireless or wired communication systems. In some examples, the onboard computer 104, 124 is coupled to one or more communication systems via a mesh network of devices, such as a mesh network formed by autonomous vehicles.

According to various implementations, the autonomous driving systems 100, 120 of FIGS. 1A, 1B function to enable an autonomous vehicle 110, 130 to modify and/or set a driving behavior in response to parameters set by vehicle passengers (e.g., via a passenger interface). Driving behavior of an autonomous vehicle may be modified according to explicit input or feedback (e.g., a passenger specifying a maximum speed or a relative comfort level), implicit input or feedback (e.g., a passenger's heart rate), or any other suitable data or manner of communicating driving behavior preferences.

The autonomous vehicle 110. 130 is preferably a fully autonomous automobile, but may additionally or alternatively be any semi-autonomous or fully autonomous vehicle. In various examples, the autonomous vehicle 110, 130 is a boat, an unmanned aerial vehicle, a driverless car, a golf cart, a truck, a van, a recreational vehicle, a train, a tram, a three-wheeled vehicle, a bicycle, a scooter, a tractor, a lawn mower, a commercial vehicle, an airport vehicle, or a utility vehicle. Additionally, or alternatively, the autonomous vehicles may be vehicles that switch between a semi-autonomous state and a fully autonomous state and thus, some autonomous vehicles may have attributes of both a semi-autonomous vehicle and a fully autonomous vehicle depending on the state of the vehicle.

In various implementations, the autonomous vehicle 110, 130 includes a throttle interface that controls an engine throttle, motor speed (e.g., rotational speed of electric motor), or any other movement-enabling mechanism. In various implementations, the autonomous vehicle 110, 130 includes a brake interface that controls brakes of the autonomous vehicle 110, 130 and controls any other movement-retarding mechanism of the autonomous vehicle 110, 130. In various implementations, the autonomous vehicle 110, 130 includes a steering interface that controls steering of the autonomous vehicle 110, 130. In one example, the steering interface changes the angle of wheels of the autonomous vehicle. The autonomous vehicle 110, 130 may additionally or alternatively include interfaces for control of any other vehicle functions, for example, windshield wipers, headlights, turn indicators, air conditioning, etc.

Ice and Snow Accumulation Detection Module

Figure 2:
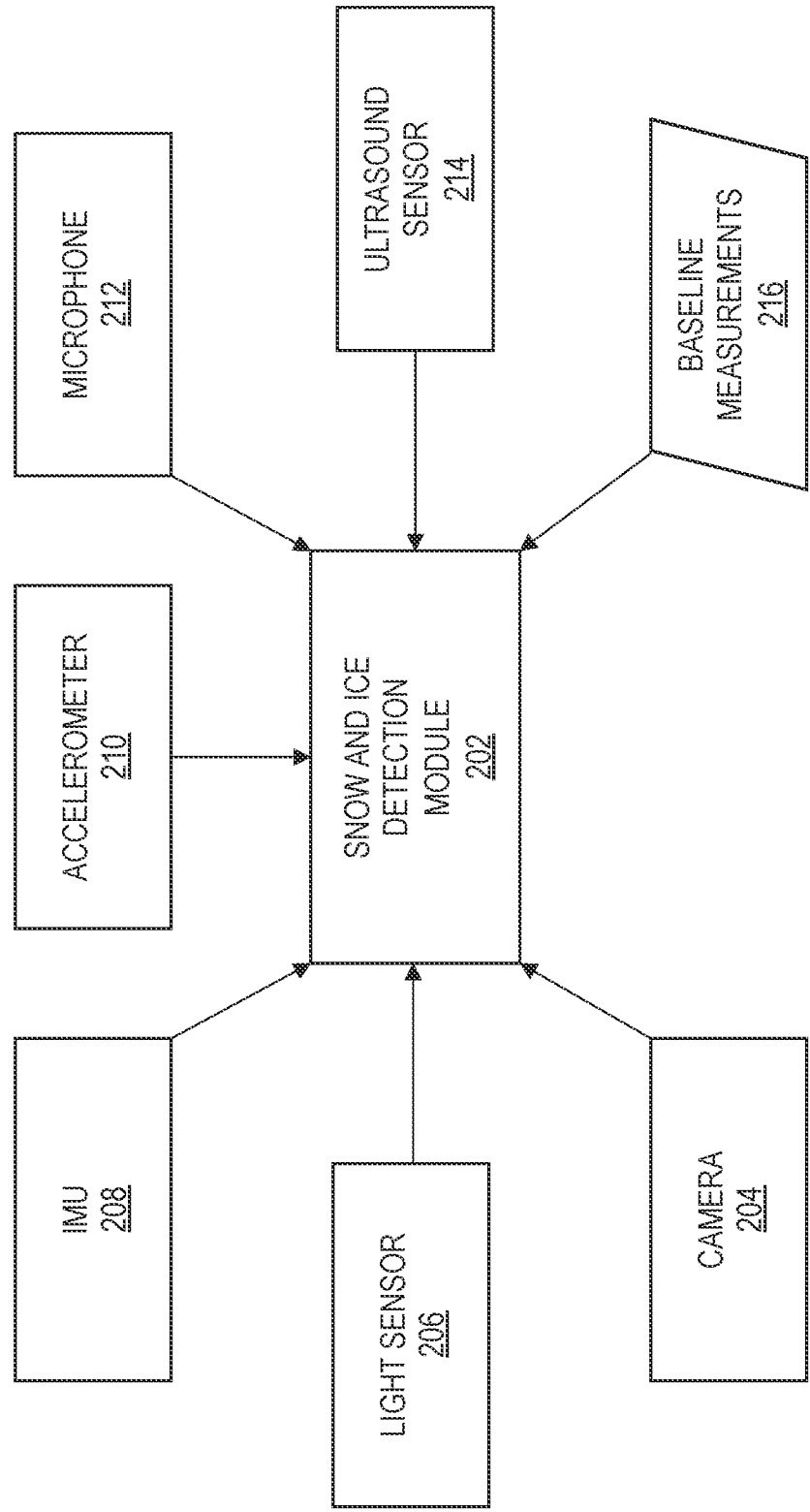
FIG. 2 is a block diagram illustrating a snow and ice detection module, according to some examples of the present disclosure.

FIG. 2 is a block diagram illustrating a snow and ice detection module 202, according to various examples of the present disclosure. The snow and ice detection module 202 can be configured to detect the accumulation of snow and/or ice on a surface of a vehicle. The surface can be any vehicle surface that is near horizontal, such as the roof, hood, or trunk. Near horizontal surfaces can include surfaces on which snow can accumulate. In some examples, near horizontal surfaces include surfaces that have less than a twenty degree incline with respect to horizontal. In some examples, the surface can be any vehicle surface, such as a window, windshield, door, headlight, or bumper. In some examples, the snow and ice detection module can determine the level of snow and/or ice accumulation at different positions on the vehicle. In various examples, the snow and ice detection module 202 can distinguish between snow and/or ice on the vehicle versus dirt and/or dust occluding a vehicle sensor.

According to various implementations, the snow and ice detection module 202 receives input sensor data from various sensors. In some examples, the snow and ice detection module 202 processes the sensor data to determine a presence of snow and/or ice on the vehicle. In some examples, the sensor data is pre-processed before being transmitted to the snow and ice detection module 202, and the snow and ice detection module 202 uses the pre-processed data to detect the presence of snow and/or ice on the vehicle.

The sensor data input to the snow and ice detection module 202 can include one or more of camera data from a camera 204, light sensor data from a light sensor 206, IMU data from an IMU 208, accelerometer data from an accelerometer 210, microphone data from a microphone 212, and ultrasound data from an ultrasound sensor 214. Additionally, the snow and ice detection module 202 can receive baseline measurements 216. The baseline measurements can include recent measurements from other fleet vehicles.

The IMU data from the IMU 208 can include lateral and longitudinal acceleration measurements as well as linear velocity, torque, and angular rate. In various examples, the IMU can include one or more accelerometers and one or more gyroscopes. The IMU data can be used to determine the inertia of the vehicle chassis, including measurements of roll, pitch, and yaw of the vehicle chassis. In some examples, the IMU data can be used by the snow and ice detection module 202 to determine the mass of the snow and/or ice on the vehicle. In particular, the additional weight of the snow and ice on the vehicle affects the vehicle dynamics, such as vehicle acceleration and torque. In particular, the additional mass of the snow and ice affects lateral and longitudinal acceleration. In some examples, the additional mass of snow and ice can act on vehicle suspension. In some examples, increased weight on the vehicle can decrease an acceleration response. In various examples, the additional mass of snow and ice can affect the roll, pitch, and yaw of the vehicle chassis, and the differing roll, pitch and yaw offsets can be used to detect the presence of snow and/or ice on the vehicle, as well as to determine the mass of the snow and ice on the vehicle. In various examples, the roll of the chassis is the side-to-side motion of the chassis, the pitch of the chassis is the front-to-back motion of the chassis, and the yaw of the chassis is the rotating motion of the chassis. In some examples, the snow and ice detection module 202 determines whether the IMU data includes measurements that have crossed a selected threshold, indicating the presence of snow and/or ice on the vehicle. In some examples, the snow and ice detection module 202 also receives data on the torque used to accelerate the vehicle, where an increased torque measurement can indicate additional weight and the presence of ice and/or snow on the vehicle.

In various implementations, the snow and ice detection module 202 has knowledge of other additional weight in the vehicle. For example, if the vehicle has picked up a passenger or a delivery, the additional weight of the passenger or delivery is determined when the passenger enters the vehicle or when the delivery is placed in the vehicle, and the baseline weight of the vehicle is adjusted to account for the additional weight of the passenger or delivery. The baseline weight is used to determine expected chassis response. In contrast, snow and/or ice on a vehicle surface accumulates slowly over time, and the actual chassis response is used to determine the mass of the additional snow and/or ice.

In various examples, the snow and ice detection module 202 receives additional sensor data from various vehicle sensors. In some examples, additional sensor data can increase the accuracy of the snow and ice detection module 202 in detecting snow and/or ice on the vehicle. In some examples, the snow and ice detection module 202 receives other sensor data from various vehicle sensors, and the detection of snow and/or ice is based on data from other sensors.

In some implementations, the snow and ice detection module 202 receives acceleration data from one or more embedded accelerometers 210. The accelerometers 210 can be embedded in the vehicle body panels, vehicle fascia, other vehicle elements, and in other features protruding from the vehicle, to provide acceleration data at different points in the vehicle. In various examples, the accelerometers are installed around the vehicle body to collect acceleration information at different points on the vehicle. In some examples, the acceleration data from the embedded accelerometers 210 can be used in conjunction with the IMU data to detect the presence of snow and/or ice on the vehicle. In particular, acceleration data can be used to determine a response of the vehicle chassis to attempted acceleration, and thereby determine a weight of snow and ice on the vehicle. In some examples, the acceleration data from the embedded accelerometers 210 can be used in conjunction with the IMU data to determine the thickness or depth of snow and/or ice on the vehicle. In various examples, the accelerometer data can be processed using conventional digital signal processing techniques as well as with machine learning techniques to enhance the signals and extract features, such as spectra shape and peak G feature. The snow and ice detection module 202 can use the processed accelerometer data to detect the added mass of snow or ice on the surfaces of the vehicle.

In some implementations, the snow and ice detection module 202 receives light sensor data from the light sensor 206. The light sensor data can include the intensity of light received at the sensor. The light sensor data can include a lumen measurement. In some examples, the light sensor 206 is located on a vehicle roof. In some examples, a vehicle uses the light sensor 206 to determine when to automatically illuminate vehicle headlights. In particular, in some examples, when the light intensity received at the light sensor 206 drops below a selected threshold, the vehicle determines that the ambient light level is low and illuminates the headlights. In various implementations, the light intensity at the light sensor 206 can decrease if the light sensor becomes dirty or snow and/or ice occlude the light sensor 206.

Additional vehicle sensors can be used to determine the cause of decreased light intensity at the light sensor. For example, if dirt and/or dust occlude the light sensor 206, similar dirt and/or dust likely occlude other vehicle sensors such as vehicle cameras 204 and ultrasound sensors 214. However, when the light sensor 206 is positioned on a vehicle surface that is horizontal or near horizontal, snow and/or ice can occlude the light sensor 206 while sensors that are located on vertical and/or diagonal surfaces remain clear. Thus, in some examples, when snow and/or ice accumulate on a vehicle, a first lumen measurement based on data from the light sensor 206 can be compared to a second lumen measurement based on data from a camera 204 to determine that the light sensor 206 is occluded with snow and/or ice. The camera 204 can be positioned in a vehicle sensor suite, such as the sensor suites 102 and 122 of FIGS. 1A and 1B, or the camera 204 can be located in another near vertical surface of the vehicle, such as in a vehicle bumper, a vehicle side, a vehicle rear, a vehicle front, or a vehicle door. In some examples, data from multiple vehicle perception cameras can be used to measure a level of light around the vehicle.

In some examples, additional sensor data can be used by the snow and ice detection module to determine the presence of snow and/or ice decreasing the light intensity at the light sensor 206, such as temperature data, and fleet baseline measurements 216. According to various examples, the lower the level of light at the light sensor 206 (the lower the lumen measurement) on the roof, the greater the thickness of the snow and/or ice on the roof and occluding the light sensor 206. In particular, increased depth of snow and/or ice can be estimated based on the lower the level of light at the light sensor 206 as compared to the level of light at a vehicle camera.

In some implementations, an exterior vehicle microphone 212 can be used to detect an attenuation of received acoustic data indicating snow and/or ice is present on the microphone 212. In particular, snow and/or ice on the microphone can cause an attenuation in microphone data. An acoustic processing module can be included in the snow and ice detection module 202, or the acoustic processing module can receive the microphone 212 data, process the microphone 212 data, and transmit the processed microphone data to the snow and ice detection module. The snow and ice detection module 202 can use the processed microphone data to detect the presence of snow and/or ice on the vehicle.

In some implementations, the snow and ice detection module 202 receives ultrasound data from an ultrasound sensor 214. Ultrasound sensors 214 can be used to detect near-range objects, and in particular, ultrasound sensors 214 can be used to detect objects that are less than two meters from the vehicle. In some examples, ultrasound sensors 214 can detect snow and/or ice accumulated on the sensor 214.

In various implementations, the snow and ice detection module 202 receives baseline measurements 216 from a central computer or back office. The baseline measurements 216 can be used to determine a baseline average light level (lumen measurement) and a baseline average mass measurement. The baseline measurements 216 can be used in determining a relative magnitude of snow and/or ice accumulation for an individual vehicle. The baseline measurements 216 can include measurements from other vehicles in the fleet, and the baseline measurements can include an average of measurements from other vehicles in the fleet. In some examples, the baseline measurements include measurements from other fleet vehicles that are located within a selected distance of the vehicle in which the snow and ice detection module 202 is located. In various examples, the snow and ice detection module 202 can compare its measurements to the baseline measurements 216. In one example, a baseline lumen measurement for other nearby fleet vehicles can provide information about ambient light, which can be used to compare with the light intensity at the light sensor 206. In some examples, the snow and ice detection module also maintains its own database of baseline vehicle measurements, such that it has typical sensor data measurements for comparison with current and/or new data.

In various implementations, the snow and ice detection module 202 can utilize fusion of data from the IMU, embedded accelerometers, cameras, light sensors, microphones, and/or ultrasonic detection, to identify the instance, position, and level of snow and ice accumulation on the vehicle. Additionally, the snow and ice detection module 202 can leverage machine learning models to more accurately determine the extent of snow and/or ice accumulation.

In various implementations, the snow and ice detection module 202 can be used to monitor snow and ice accumulation over time. In particular, sensor data can be periodically updated and snow and ice detection measurements can be periodically updated. Updated measurements can be compared to older measurements to detect changes over time, as well as to determine an overall accumulation of snow and/or ice over time.

In various implementations, the snow and ice detection module 202 includes a communication module for communicating with a central computer. In particular, the snow and ice detection module 202 can communicate current snow and ice accumulation data with a central computer, such as when snow and/or ice has been detected on the vehicle and/or a level of snow and/or ice accumulation on the vehicle. Additionally, the snow and ice detection module 202 can communicate sensor data and/or measurements based on the sensor data with a central computer. In some examples, the snow and ice detection module 202 communicates with an onboard computer, and the onboard computer communicates with the central computer.

According to various implementations, when snow and/or ice is detected on a vehicle, remedial actions can be taken to remove the snow and/or ice from the vehicle before the vehicle resumes operation. Remedial actions include actions taken by the vehicle itself, such as heating a vehicle surface to melt ice and/or snow, and/or driving to a facility for remedial action. Remedial actions can include pulling over and/or parking the vehicle.

Method for Detection of Ice and Snow Accumulation

Figure 3:
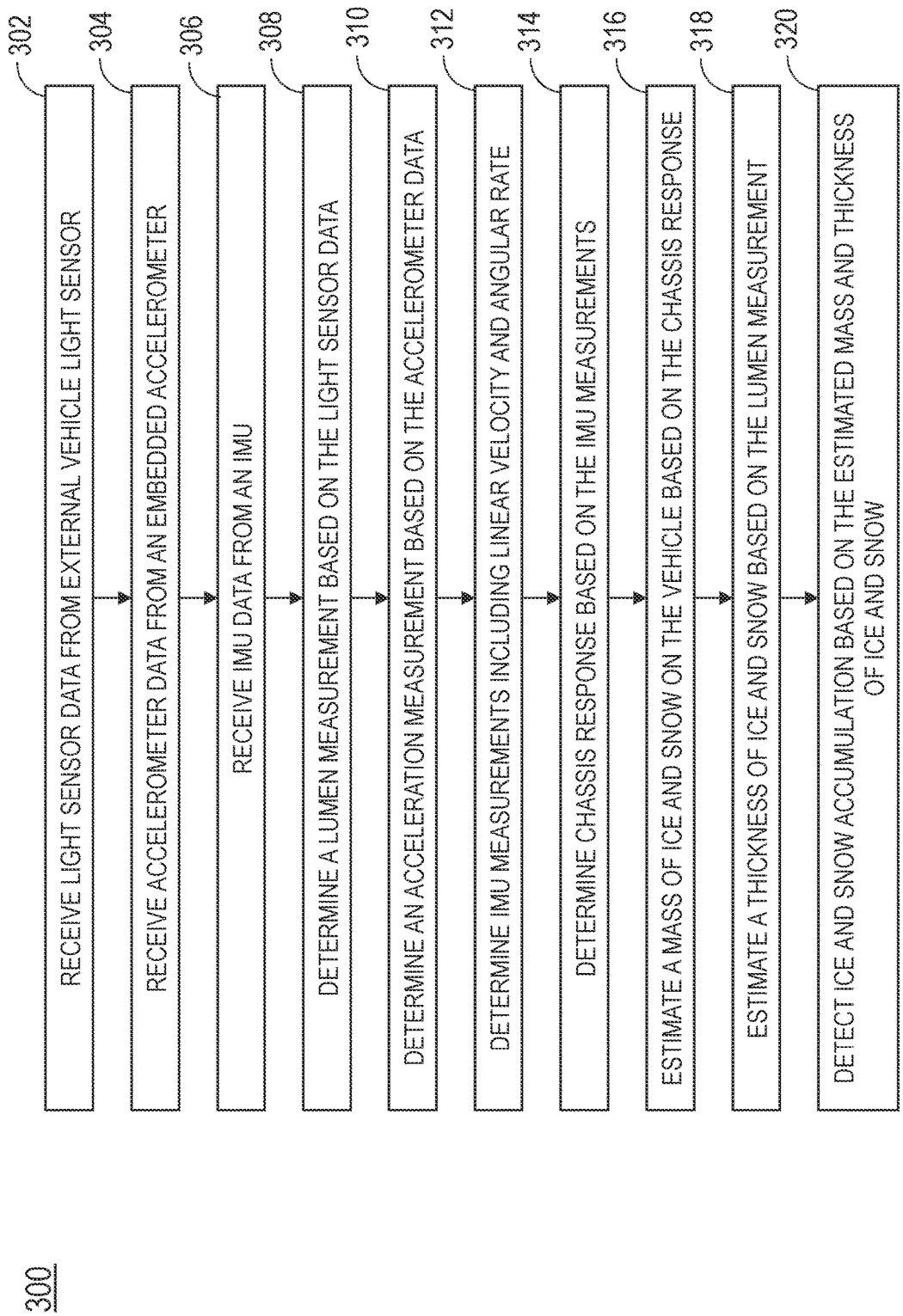
FIG. 3 illustrates a flow chart of a method for detection of ice and snow accumulation, according to some examples of the present disclosure.

FIG. 3 is a flow chart illustrating a method 300 for detection of snow and ice accumulation on a vehicle, according to various examples of the present disclosure. At step 302, light sensor data is received from an external vehicle light sensor. As discussed above, the vehicle light sensor can be located in a vehicle roof. The vehicle light sensor can be used to determine ambient light levels. In some examples, the vehicle light sensor is used to determine when ambient light levels have decreased below a selected level and illuminate vehicle headlights. At step 304, accelerometer data is received from an embedded accelerometer. In various examples, accelerometer data is received from multiple embedded accelerometers located at different places on the vehicle. At step 306, inertial measurement data is received from an inertial measurement unit (IMU). The IMU can include an accelerometer and a gyroscope, and can provide data on the inertia of the vehicle chassis. IMU data can include lateral and longitudinal acceleration measurements as well as linear velocity, torque, and angular rate.

At step 308, a lumen measurement is determined based on the light sensor data. The light sensor lumen measurement can indicate the intensity of light at the light sensor. At step 310, an acceleration measurement is determined based on the accelerometer data. In particular, when accelerometer data is received from multiple accelerometers, the acceleration of various parts of the vehicle can be determined and compared. The accelerometer data can be combined with the IMU data to determine lateral and longitudinal acceleration of the vehicle. At step 312, IMU measurements including a linear velocity and an angular rate are determined. In various examples, the IMU measurements include roll, pitch, and yaw of the vehicle chassis. In some examples, the IMU measurements include a roll offset, a pitch offset, and a yaw offset of the vehicle chassis, where the offset indicates a change from typical roll, pitch, and yaw values.

At step 314, a chassis response of the vehicle chassis is determined based on the IMU measurements and the acceleration measurements. In some examples, the IMU data can be used to determine measurements including roll, pitch, and yaw of the vehicle chassis. In various examples, snow and/or ice on a vehicle weighs the vehicle down and delays the chassis response to attempted vehicle acceleration. At step 316, the mass of the ice and the snow on the vehicle can be estimated based on the chassis response. Similarly, the weight of the ice and the snow on the vehicle can be estimated based on the chassis response.

At step 318, a thickness of the ice and the snow on the vehicle based on the lumen measurement. In particular, in various examples, the lumen measurement can be compared to a light intensity measurement from another light sensor and/or from a vehicle perception camera to determine the decrease in light intensity at the light sensor due to the presence of snow and/or ice on the light sensor. At step 320, ice and/or snow accumulation is detected based on the estimated mass of the ice and snow and the estimated thickness of the ice and snow.

In various examples, the ice and snow accumulation, including the estimated mass and the estimated thickness, is communicated with a central computer. In some examples, the snow and ice detection module can receive a baseline lumen measurement from the central computer. Similarly, in some examples, the snow and ice detection module can receive a baseline mass measurement from the central computer. The baseline lumen measurement and the baseline mass measurement can be based on fleet data or on data from a selected portion of a vehicle fleet.

In various implementations, the method 300 can be repeated to monitor ice and snow accumulation over time. When snow and/or ice are detected on a vehicle, remedial actions to remove the snow and/or ice can be initiated.

Example of an Autonomous Vehicle Fleet System for Snow and Ice Detection

Figure 4:
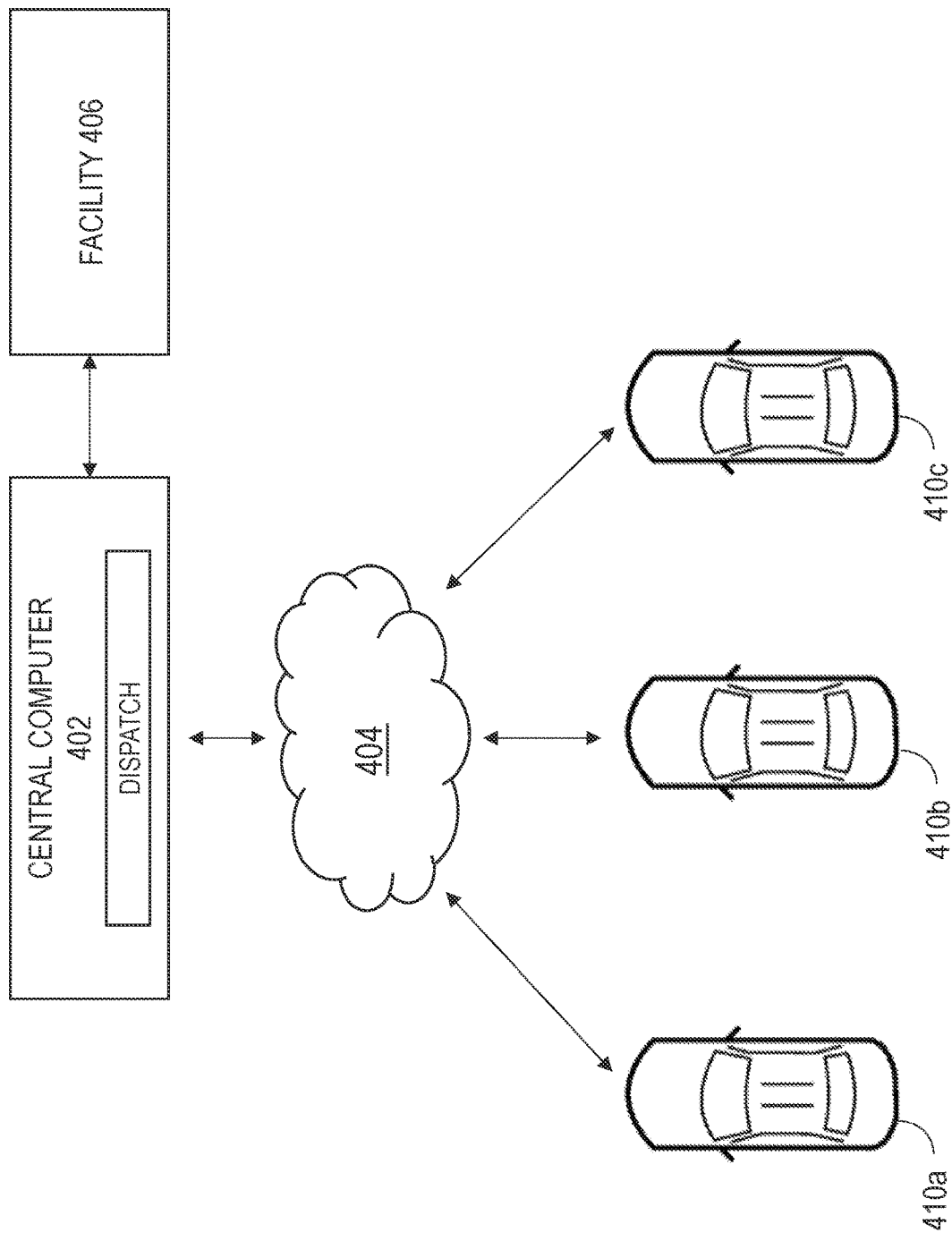
FIG. 4 is a diagram illustrating a fleet of autonomous vehicles in communication with a central computer, according to some embodiments of the disclosure.

FIG. 4 is a diagram 400 illustrating a fleet of autonomous vehicles 410a, 410b, 410c in communication with a central computer 402, according to some embodiments of the disclosure. The vehicles 410a-410c communicate wirelessly with a cloud 404 and a central computer 402. The central computer 402 includes a routing coordinator, a dispatch service, and a database of information from the vehicles 410a-410c in the fleet. In various examples, the vehicles 410a-410c communicate snow and ice detection data with the central computer 402. In some examples, the database of information can include snow and/or ice accumulation data as well as other sensor data such as light intensity at the light sensor of each vehicle 410a, 410b, 410c. The central computer 402 can monitor snow and ice accumulation across the vehicles 410a-410c in the fleet to schedule and prioritize remediation activities.

Autonomous vehicle fleet routing refers to the routing of multiple vehicles in a fleet. The central computer 402 also communicates with various vehicle facilities such as the vehicle facility 406. In some examples, the dispatch system at the central computer 402 can communicate a service instruction to any of the vehicles 410a-410c. In some examples, snow and/or ice has accumulated on a vehicle 410a-410c, and the snow and/or ice needs to be cleared off the vehicle 410a-410c. The dispatch system can then route the vehicle 410a-410c to a facility 406 for service including snow and ice removal.

As described above, each vehicle 410a-410c in the fleet of vehicles communicates with a routing coordinator. Thus, information gathered by various autonomous vehicles 410a-410c in the fleet can be saved and used to generate information for future routing determinations. For example, sensor data can be used to generate route determination parameters. In general, the information collected from the vehicles in the fleet can be used for route generation or to modify existing routes. In some examples, the routing coordinator collects and processes position data from multiple autonomous vehicles in real-time to avoid traffic and generate a fastest-time route for each autonomous vehicle. In some implementations, the routing coordinator uses collected position data to generate a best route for an autonomous vehicle in view of one or more traveling preferences and/or routing goals. In some examples, the routing coordinator uses collected position data corresponding to emergency events to generate a best route for an autonomous vehicle to avoid a potential emergency situation and associated unknowns. In some examples, the routing coordinator generates a route for a vehicle to the facility 406. In some examples, a vehicle has one or more scheduled stops before embarking on its route to the facility 406.

Example Autonomous Vehicle Management System

Figure 5:
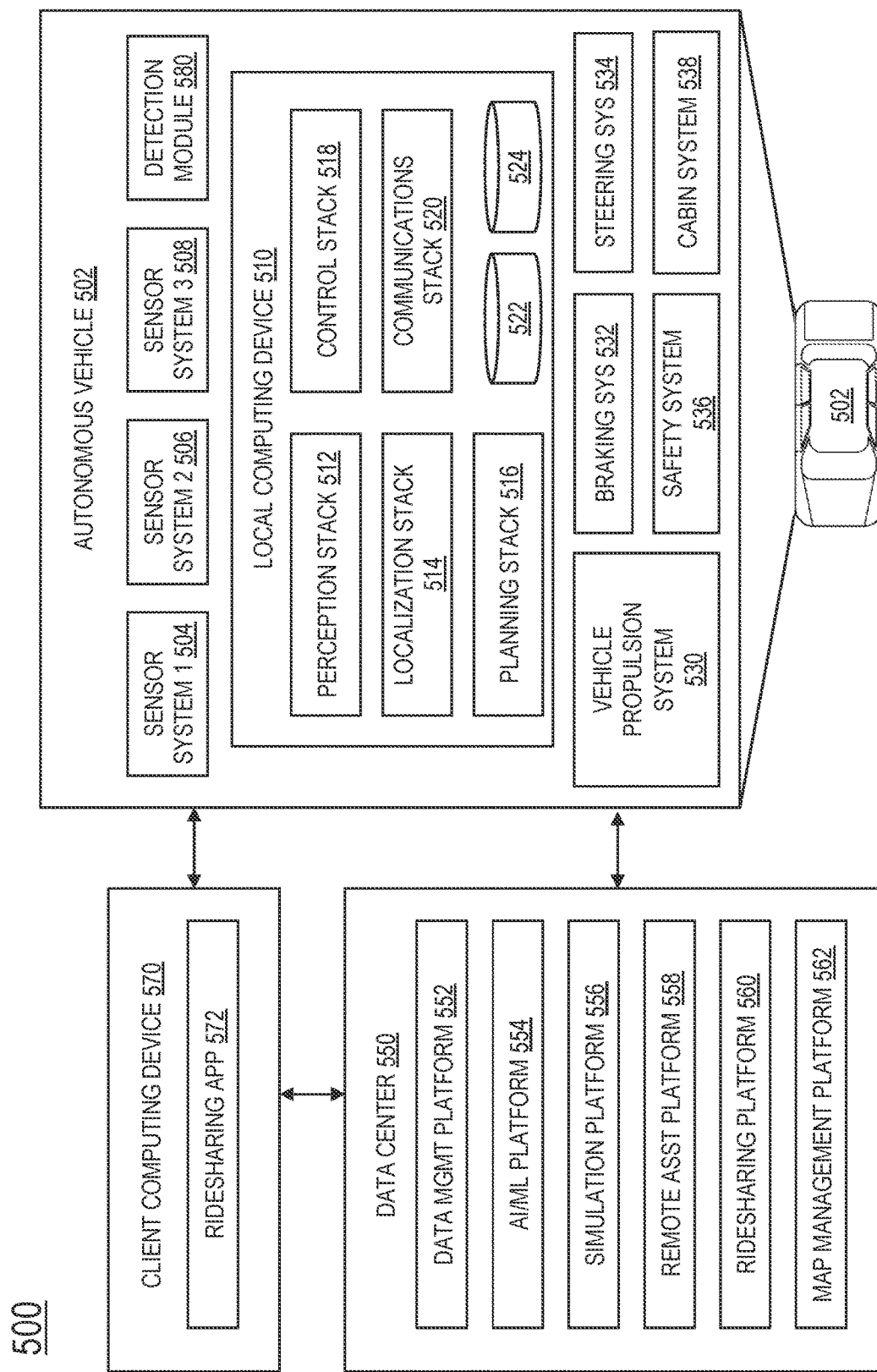
FIG. 5 illustrates an example system environment that can be used to facilitate autonomous vehicle (AV) dispatch and operations, according to some aspects of the disclosed technology.

Turning now to FIG. 5, this figure illustrates an example of an AV management system 500. One of ordinary skill in the art will understand that, for the AV management system 500 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 500 includes an AV 502, a data center 550, and a client computing device 570. The AV 502, the data center 550, and the client computing device 570 can communicate with one another over one or more networks (not shown), such as a public network (e.g., the Internet, an Infrastructure as a Service (IaaS) network, a Platform as a Service (PaaS) network, a Software as a Service (Saas) network, another Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 502 can navigate about roadways without a human driver based on sensor signals generated by multiple sensor systems 504, 506, and 508. The sensor systems 504-508 can include different types of sensors and can be arranged about the AV 502. For instance, the sensor systems 504-508 can comprise Inertial Measurement Units (IMUs), cameras (e.g., still image cameras, video cameras, etc.), light sensors (e.g., LIDAR systems, ambient light sensors, infrared sensors, etc.), RADAR systems, a Global Navigation Satellite System (GNSS) receiver, (e.g., Global Positioning System (GPS) receivers), audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 504 can be a camera system, the sensor system 506 can be a LIDAR system, and the sensor system 508 can be a RADAR system. Other embodiments may include any other number and type of sensors. In various examples, the sensor systems can be used to detect snow and/or ice on the AV 502, and the sensor systems can be used to detect snow and/or ice accumulation on the AV 502. In some examples, a snow and ice detection module 580 can receive data from the sensor systems 504, 506, 508 and detect snow and/or ice on the vehicle based on the received data.

AV 502 can also include several mechanical systems that can be used to maneuver or operate AV 502. For instance, the mechanical systems can include vehicle propulsion system 530, braking system 532, steering system 534, safety system 536, and cabin system 538, among other systems. Vehicle propulsion system 530 can include an electric motor, an internal combustion engine, or both. The braking system 532 can include an engine brake, a wheel braking system (e.g., a disc braking system that utilizes brake pads), hydraulics, actuators, and/or any other suitable componentry configured to assist in decelerating AV 502. The steering system 534 can include suitable componentry configured to control the direction of movement of the AV 502 during navigation. Safety system 536 can include lights and signal indicators, a parking brake, airbags, and so forth. The cabin system 538 can include cabin temperature control systems, in-cabin entertainment systems, and so forth. In some embodiments, the AV 502 may not include human driver actuators (e.g., steering wheel, handbrake, foot brake pedal, foot accelerator pedal, turn signal lever, window wipers, etc.) for controlling the AV 502. Instead, the cabin system 538 can include one or more client interfaces (e.g., Graphical User Interfaces (GUIs), Voice User Interfaces (VUIs), etc.) for controlling certain aspects of the mechanical systems 530-538.

AV 502 can additionally include a local computing device 510 that is in communication with the sensor systems 504-508, the mechanical systems 530-538, the data center 550, and the client computing device 570, among other systems. The local computing device 510 can include one or more processors and memory, including instructions that can be executed by the one or more processors. The instructions can make up one or more software stacks or components responsible for controlling the AV 502; communicating with the data center 550, the client computing device 570, and other systems; receiving inputs from riders, passengers, and other entities within the AV's environment; logging metrics collected by the sensor systems 504-508; and so forth. In this example, the local computing device 510 includes a perception stack 512, a mapping and localization stack 514, a planning stack 516, a control stack 518, a communications stack 520, a High Definition (HD) geospatial database 522, and an AV operational database 524, among other stacks and systems.

Perception stack 512 can enable the AV 502 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 504-508, the mapping and localization stack 514, the HD geospatial database 522, other components of the AV, and other data sources (e.g., the data center 550, the client computing device 570, third-party data sources, etc.). The perception stack 512 can detect and classify objects and determine their current and predicted locations, speeds, directions, and the like. In addition, the perception stack 512 can determine the free space around the AV 502 (e.g., to maintain a safe distance from other objects, change lanes, park the AV, etc.). The perception stack 512 can also identify environmental uncertainties, such as where to look for moving objects, flag areas that may be obscured or blocked from view, and so forth. The perception stack 512 can be used in sentinel mode to sense the vehicle environment and identify objects.

Mapping and localization stack 514 can determine the AV's position and orientation (pose) using different methods from multiple systems (e.g., GPS, IMUs, cameras, LIDAR, RADAR, ultrasonic sensors, the HD geospatial database 522, etc.). For example, in some embodiments, the AV 502 can compare sensor data captured in real-time by the sensor systems 504-508 to data in the HD geospatial database 522 to determine its precise (e.g., accurate to the order of a few centimeters or less) position and orientation. The AV 502 can focus its search based on sensor data from one or more first sensor systems (e.g., GPS) by matching sensor data from one or more second sensor systems (e.g., LIDAR). If the mapping and localization information from one system is unavailable, the AV 502 can use mapping and localization information from a redundant system and/or from remote data sources.

The planning stack 516 can determine how to maneuver or operate the AV 502 safely and efficiently in its environment. For example, the planning stack 516 can receive the location, speed, and direction of the AV 502, geospatial data, data regarding objects sharing the road with the AV 502 (e.g., pedestrians, bicycles, vehicles, ambulances, buses, cable cars, trains, traffic lights, lanes, road markings, etc.) or certain events occurring during a trip (e.g., an Emergency Vehicle (EMV) blaring a siren, intersections, occluded areas, street closures for construction or street repairs, Double-Parked Vehicles (DPVs), etc.), traffic rules and other safety standards or practices for the road, user input, and other relevant data for directing the AV 502 from one point to another. The planning stack 516 can determine multiple sets of one or more mechanical operations that the AV 502 can perform (e.g., go straight at a specified speed or rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 516 can select from multiple backup plans to carry out. For example, while preparing to change lanes to turn right at an intersection, another vehicle may aggressively cut into the destination lane, making the lane change unsafe. The planning stack 516 could have already determined an alternative plan for such an event, and upon its occurrence, help to direct the AV 502 to go around the block instead of blocking a current lane while waiting for an opening to change lanes.

The control stack 518 can manage the operation of the vehicle propulsion system 530, the braking system 532, the steering system 534, the safety system 536, and the cabin system 538. The control stack 518 can receive sensor signals from the sensor systems 504-508 as well as communicate with other stacks or components of the local computing device 510 or a remote system (e.g., the data center 550) to effectuate operation of the AV 502. For example, the control stack 518 can implement the final path or actions from the multiple paths or actions provided by the planning stack 516. This can involve turning the routes and decisions from the planning stack 516 into commands for the actuators that control the AV's steering, throttle, brake, and drive unit.

The communication stack 520 can transmit and receive signals between the various stacks and other components of the AV 502 and between the AV 502, the data center 550, the client computing device 570, and other remote systems. The communication stack 520 can enable the local computing device 510 to exchange information remotely over a network, such as through an antenna array or interface that can provide a metropolitan WIFI® network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communication stack 520 can also facilitate local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 522 can store HD maps and related data of the streets upon which the AV 502 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane or road centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines, and/or boundaries, etc.) and related attributes (e.g., permissive, protected/permissive, or protected only left turn lanes; permissive, protected/permissive, or protected only U-turn lanes; permissive or protected only right turn lanes; etc.). The traffic controls layer can include geospatial information of traffic signal lights, traffic signs, and other road objects and related attributes.

The AV operational database 524 can store raw AV data generated by the sensor systems 504-508 and other components of the AV 502 and/or data received by the AV 502 from remote systems (e.g., the data center 550, the client computing device 570, etc.). In some embodiments, the raw AV data can include HD LIDAR point cloud data, image or video data, RADAR data, GPS data, and other sensor data that the data center 550 can use for creating or updating AV geospatial data as discussed further below with respect to FIG. 5 and elsewhere in the present disclosure.

The data center 550 can be a private cloud (e.g., an enterprise network, a co-location provider network, etc.), a public cloud (e.g., an Infrastructure as a Service (IaaS) network, a Platform as a Service (PaaS) network, a Software as a Service (Saas) network, or other Cloud Service Provider (CSP) network), a hybrid cloud, a multi-cloud, and so forth. The data center 550 can include one or more computing devices remote to the local computing device 510 for managing a fleet of AVs and AV-related services. For example, in addition to managing the AV 502, the data center 550 may also support a ridesharing service, a delivery service, a remote/roadside assistance service, street services (e.g., street mapping, street patrol, street cleaning, street metering, parking reservation, etc.), and the like.

The data center 550 can send and receive various signals to and from the AV 502 and the client computing device 570. These signals can include sensor data captured by the sensor systems 504-508, roadside assistance requests, software updates, ridesharing pick-up and drop-off instructions, and so forth. In this example, the data center 550 includes one or more of a data management platform 552, an Artificial Intelligence/Machine Learning (AI/ML) platform 554, a simulation platform 556, a remote assistance platform 558, a ridesharing platform 560, and a map management platform 562, among other systems.

Data management platform 552 can be a "big data" system capable of receiving and transmitting data at high speeds (e.g., near real-time or real-time), processing a large variety of data, and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service data, map data, audio data, video data, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 550 can access data stored by the data management platform 552 to provide their respective services.

The AI/ML platform 554 can provide the infrastructure for training and evaluating machine learning algorithms for operating the AV 502, the simulation platform 556, the remote assistance platform 558, the ridesharing platform 560, the map management platform 562, and other platforms and systems. Using the AI/ML platform 554, data scientists can prepare data sets from the data management platform 552; select, design, and train machine learning models; evaluate, refine, and deploy the models; maintain, monitor, and retrain the models; and so on.

The simulation platform 556 can enable testing and validation of the algorithms, machine learning models, neural networks, and other development efforts for the AV 502, the remote assistance platform 558, the ridesharing platform 560, the map management platform 562, and other platforms and systems. The simulation platform 556 can replicate a variety of driving environments and/or reproduce real-world scenarios from data captured by the AV 502, including rendering geospatial information and road infrastructure (e.g., streets, lanes, crosswalks, traffic lights, stop signs, etc.) obtained from the map management platform 562; modeling the behavior of other vehicles, bicycles, pedestrians, and other dynamic elements; simulating inclement weather conditions, different traffic scenarios; and so on.

The remote assistance platform 558 can generate and transmit instructions regarding the operation of the AV 502. For example, in response to an output of the AI/ML platform 554 or other system of the data center 550, the remote assistance platform 558 can prepare instructions for one or more stacks or other components of the AV 502.

The ridesharing platform 560 can interact with a customer of a ridesharing service via a ridesharing application 572 executing on the client computing device 570. The client computing device 570 can be any type of computing system, including a server, desktop computer, laptop, tablet, smartphone, smart wearable device (e.g., smart watch; smart eyeglasses or other Head-Mounted Display (HMD); smart ear pods or other smart in-ear, on-ear, or over-ear device; etc.), gaming system, or other general purpose computing device for accessing the ridesharing application 572. The client computing device 570 can be a customer's mobile computing device or a computing device integrated with the AV 502 (e.g., the local computing device 510). The ridesharing platform 560 can receive requests to be picked up or dropped off from the ridesharing application 572 and dispatch the AV 502 for the trip.

Map management platform 562 can provide a set of tools for the manipulation and management of geographic and spatial (geospatial) and related attribute data. The data management platform 552 can receive LIDAR point cloud data, image data (e.g., still image, video, etc.), RADAR data, GPS data, and other sensor data (e.g., raw data) from one or more AVs 502, Unmanned Aerial Vehicles (UAVs), satellites, third-party mapping services, and other sources of geospatially referenced data. The raw data can be processed, and map management platform 562 can render base representations (e.g., tiles (2D), bounding volumes (3D), etc.) of the AV geospatial data to enable users to view, query, label, edit, and otherwise interact with the data. Map management platform 562 can manage workflows and tasks for operating on the AV geospatial data. Map management platform 562 can control access to the AV geospatial data, including granting or limiting access to the AV geospatial data based on user-based, role-based, group-based, task-based, and other attribute-based access control mechanisms. Map management platform 562 can provide version control for the AV geospatial data, such as to track specific changes that (human or machine) map editors have made to the data and to revert changes when necessary. Map management platform 562 can administer release management of the AV geospatial data, including distributing suitable iterations of the data to different users, computing devices, AVs, and other consumers of HD maps. Map management platform 562 can provide analytics regarding the AV geospatial data and related data, such as to generate insights relating to the throughput and quality of mapping tasks.

In some embodiments, the map viewing services of map management platform 562 can be modularized and deployed as part of one or more of the platforms and systems of the data center 550. For example, the AI/ML platform 554 may incorporate the map viewing services for visualizing the effectiveness of various object detection or object classification models, the simulation platform 556 may incorporate the map viewing services for recreating and visualizing certain driving scenarios, the remote assistance platform 558 may incorporate the map viewing services for replaying traffic incidents to facilitate and coordinate aid, the ridesharing platform 560 may incorporate the map viewing services into the client application 572 to enable passengers to view the AV 502 in transit en route to a pick-up or drop-off location, and so on.

Figure 6:
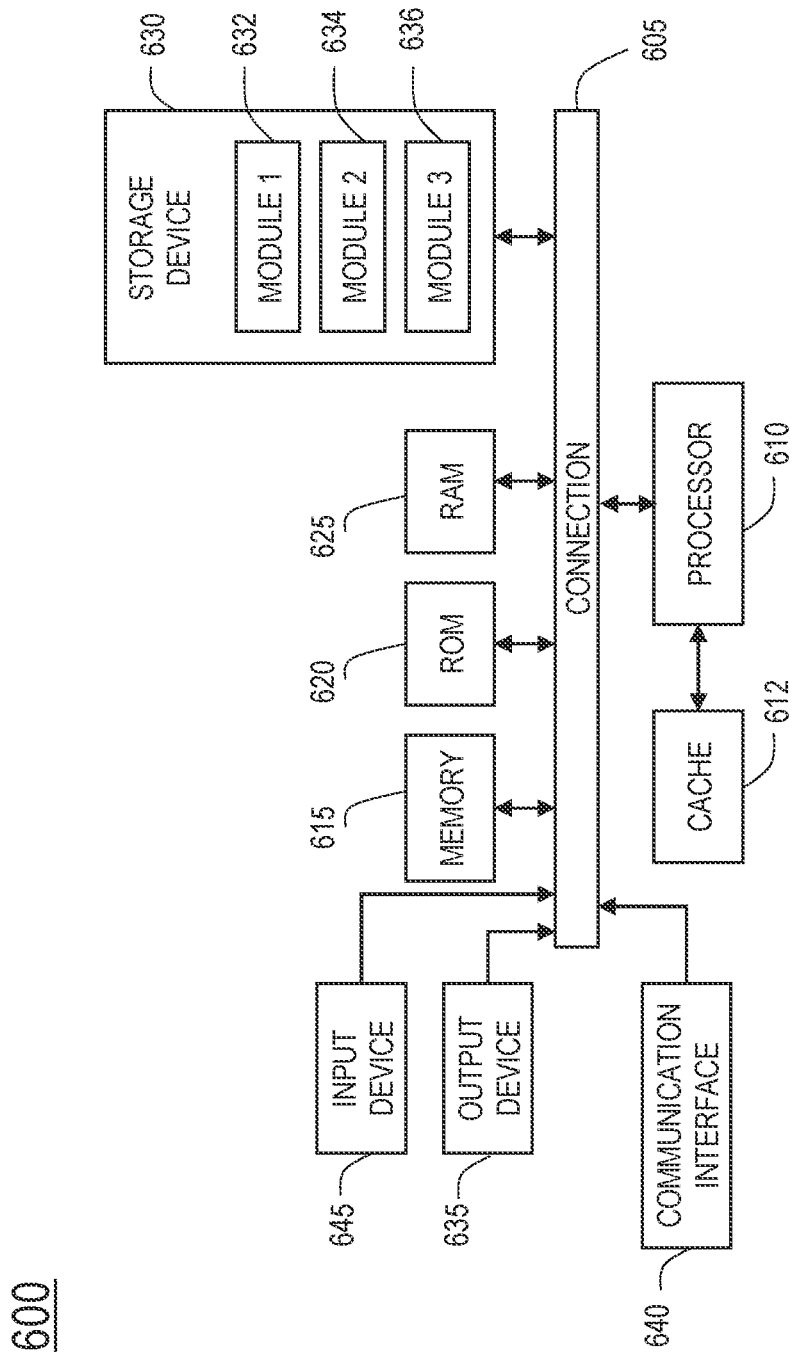
FIG. 6 illustrates an example processor-based system with which some aspects of the subject technology can be implemented.

FIG. 6 illustrates an example processor-based system with which some aspects of the subject technology can be implemented. For example, processor-based system 600 can be any computing device making up, or any component thereof in which the components of the system are in communication with each other using connection 605. Connection 605 can be a physical connection via a bus, or a direct connection into processor 610, such as in a chipset architecture. Connection 605 can also be a virtual connection, networked connection, or logical connection.

In some embodiments, computing system 600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 600 includes at least one processing unit (Central Processing Unit (CPU) or processor) 610 and connection 605 that couples various system components including system memory 615, such as Read-Only Memory (ROM) 620 and Random-Access Memory (RAM) 625 to processor 610. Computing system 600 can include a cache of high-speed memory 612 connected directly with, in close proximity to, or integrated as part of processor 610.

Processor 610 can include any general-purpose processor and a hardware service or software service, such as services 632, 634, and 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric. In some examples, the processor 610 is an image processor that can process images from vehicle image sensors. In some examples, the processor 610 can determine a sensor field of view. In some examples, the processor 610 can stitch together captured images from adjacent image sensors.

To enable user interaction, computing system 600 includes an input device 645, which can represent any number of input mechanisms, such as a microphone for speech, a touch-sensitive screen for gesture or graphical input, keyboard, mouse, motion input, speech, etc. Computing system 600 can also include output device 635, which can be one or more of a number of output mechanisms known to those of skill in the art. In some instances, multimodal systems can enable a user to provide multiple types of input/output to communicate with computing system 600. Computing system 600 can include communications interface 640, which can generally govern and manage the user input and system output. The communication interface may perform or facilitate receipt and/or transmission wired or wireless communications via wired and/or wireless transceivers, including those making use of an audio jack/plug, a microphone jack/plug, a Universal Serial Bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a Radio-Frequency Identification (RFID) wireless signal transfer, Near-Field Communications (NFC) wireless signal transfer, Dedicated Short Range Communication (DSRC) wireless signal transfer, 802.11 Wi-Fi® wireless signal transfer, Wireless Local Area Network (WLAN) signal transfer, Visible Light Communication (VLC) signal transfer, Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer signal transfer, ultraviolet light signal transfer, wireless signal transfer along the electromagnetic spectrum, or some combination thereof.

Communication interface 640 may also include one or more Global Navigation Satellite System (GNSS) receivers or transceivers that are used to determine a location of the computing system 600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a Compact Disc (CD) Read Only Memory (CD-ROM) optical disc, a rewritable CD optical disc, a Digital Video Disk (DVD) optical disc, a Blu-ray Disc (BD) optical disc, a holographic optical disk, another optical medium, a Secure Digital (SD) card, a micro SD (microSD) card, a Memory Stick® card, a smartcard chip, a EMV chip, a Subscriber Identity Module (SIM) card, a mini/micro/nano/pico SIM card, another Integrated Circuit (IC) chip/card, Random-Access Memory (RAM), Static RAM (SRAM), Dynamic RAM (DRAM), Read-Only Memory (ROM), Programmable ROM (PROM), Erasable PROM (EPROM), Electrically Erasable PROM (EEPROM), flash EPROM (FLASHEPROM), cache memory (L1/L2/L3/L4/L5/L #), Resistive RAM (RRAM/ReRAM), Phase Change Memory (PCM), Spin Transfer Torque RAM (STT-RAM), another memory chip or cartridge, and/or a combination thereof.

Storage device 630 can include software services, servers, services, etc., that when the code that defines such software is executed by the processor 610, it causes the system 600 to perform a function. In some embodiments, a hardware service that performs a particular function can include the software component stored in a computer-readable medium in connection with the necessary hardware components, such as processor 610, connection 605, output device 635, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network Personal Computers (PCs), minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

Selected Examples

Example 1 provides a vehicle for detection of ice and snow accumulation, comprising an inertial measurement unit (IMU) configured to generate IMU data, wherein the IMU includes at least one IMU accelerometer and a gyroscope; a plurality of embedded accelerometers configured to generate accelerometer data; and an ice and snow detector configured to: receive the accelerometer data and the IMU data, identify a chassis response based on the accelerometer data and the IMU data; determine a weight of ice and snow on the vehicle based on the chassis response; and determine an accumulation of ice and snow on the vehicle based on the weight determination.

Example 2 provides a method, system, and/or vehicle according to any of the preceding and/or following examples, further comprising an external light sensor, wherein the external light sensor is located on a vehicle roof, and wherein the ice and snow detector is further configured to: receive light sensor data from the external light sensor, determine a lumen measurement based on the light sensor data, and estimate a thickness of ice and snow on the vehicle roof based on the lumen measurement.

Example 3 provides a method, system, and/or vehicle according to any of the preceding and/or following examples, further comprising an external vehicle camera, and wherein the ice and snow detector is further configured to: receive camera data from the external vehicle camera, determine a light intensity measurement based on the camera data, and compare the lumen measurement with the light intensity measurement to generate a comparison, wherein estimating the thickness of the ice and the snow on the vehicle roof includes estimating a thickness of the ice and the snow on the vehicle based in part on the comparison.

Example 4 provides a method, system, and/or vehicle according to any of the preceding and/or following examples, wherein the ice and snow detector is further configured to communicate the determination of the accumulation of ice and snow on the vehicle with a central computer.

Example 5 provides a method, system, and/or vehicle according to any of the preceding and/or following examples, wherein the ice and snow detector is further configured to receive baseline measurements from the central computer, wherein the baseline measurements include a baseline ambient light measurement.

Example 6 provides a method, system, and/or vehicle according to any of the preceding and/or following examples, further comprising an external microphone, and an acoustic processing module, wherein the acoustic processing module is configured to receive microphone data and determine a sound attenuation measurement, and wherein the ice and snow detector is further configured to:

receive the sound attenuation measurement, and detect the accumulation of ice and snow based, in part, on the attenuation measurement.

Example 7 provides a method for detection of ice and snow accumulation on a vehicle comprising: receiving inertial measurement data from an inertial measurement unit (IMU); receiving accelerometer data from an embedded accelerometer; determining IMU measurements including a linear velocity and an angular rate; determining an acceleration measurement based on the accelerometer data; determining a chassis response of a vehicle chassis based on the IMU measurements and the acceleration measurement; estimating a mass of the ice and the snow on the vehicle based on the chassis response; and detecting the ice and snow accumulation based on the estimated mass of the ice and snow.

Example 8 provides a method, system, and/or vehicle according to any of the preceding and/or following examples, further comprising: receiving light sensor data from an external vehicle light sensor; determining a lumen measurement based on the light sensor data; and estimating a thickness of the ice and the snow on the vehicle based on the lumen measurement.

Example 9 provides a method, system, and/or vehicle according to any of the preceding and/or following examples, wherein the lumen measurement is a first lumen measurement and further comprising: capturing camera data with an external vehicle camera; determining a second lumen measurement based on the camera data; and comparing the first lumen measurement with the second lumen measurement to generate a comparison; and wherein estimating the thickness of the ice and the snow on the vehicle includes estimating a thickness of the ice and the snow on the vehicle based in part on the comparison.

Example 10 provides a method, system, and/or vehicle according to any of the preceding and/or following examples, wherein receiving light sensor data includes receiving first light sensor data at a first time, receiving accelerometer data includes receiving first accelerometer data at the first time, and receiving inertial measurement data includes receiving first inertial measurement data at the first time, wherein the lumen measurement is a first lumen measurement, the acceleration measurement is a first acceleration measurement, and the IMU measurements are first IMU measurements, and further comprising: monitoring the ice and snow accumulation to identify a rate of the ice and snow accumulation, wherein monitoring includes receiving, at a second time, second light sensor data, second accelerometer data, and second inertial measurement data, and determining a change in the ice and snow accumulation between the first time and the second time.

Example 11 provides a method, system, and/or vehicle according to any of the preceding and/or following examples, further comprising communicating the ice and snow accumulation, including the estimated mass and the estimated thickness, with a central computer.

Example 12 provides a method, system, and/or vehicle according to any of the preceding and/or following examples, further comprising receiving a baseline lumen measurement from the central computer and receiving a baseline mass measurement, wherein the baseline lumen measurement and the baseline mass measurement are based on fleet data.

Example 13 provides a method, system, and/or vehicle according to any of the preceding and/or following examples, wherein detecting the ice and snow accumulation includes at least one of: determining the estimated mass of the ice and the snow exceeds a selected mass threshold, and determining the estimated thickness of the ice and the snow exceeds a selected thickness threshold.

Example 14 provides a method, system, and/or vehicle according to any of the preceding and/or following examples, further comprising receiving audio data from an external vehicle microphone, and identifying attenuation based on the audio data, and wherein detecting the ice and snow accumulation further including detecting the ice and snow accumulation based on the attenuation.

Example 15 provides a method, system, and/or vehicle according to any of the preceding and/or following examples, further comprising utilizing a machine learning model for detecting the ice and snow accumulation.

Example 16 provides a method, system, and/or vehicle according to any of the preceding and/or following examples, further comprising utilizing the machine learning model for estimating the thickness of the ice and snow accumulation.

Example 17 provides a system for detection of ice and snow accumulation on a vehicle, comprising: a plurality of vehicles, each vehicle including: a respective inertial measurement unit (IMU) configured to generate IMU data, wherein the IMU includes at least one IMU accelerometer and a gyroscope; a respective plurality of embedded accelerometers configured to generate accelerometer data; and a respective ice and snow detector configured to: receive the accelerometer data and the IMU data, identify a chassis response based on the accelerometer data and the IMU data; determine a weight of ice and snow on the vehicle based on the chassis response; and determine an accumulation of ice and snow on the vehicle based on the weight determination; and a central computer in communication with each of the plurality of vehicles, and configured to generate baseline measurements for ice and snow detection.

Example 18 provides a method, system, and/or vehicle according to any of the preceding and/or following examples, wherein each of the plurality of vehicles further includes a respective external light sensor, wherein the respective external light sensor is located on a respective vehicle roof, and wherein the respective ice and snow detector is further configured to: receive light sensor data from the respective external light sensor, determine a lumen measurement based on the light sensor data, and estimate a thickness of ice and snow on the respective vehicle roof based on the lumen measurement.

Example 19 provides a method, system, and/or vehicle according to any of the preceding and/or following examples, wherein each of the plurality of vehicles further includes a respective external vehicle camera, and wherein the respective ice and snow detector in each respective vehicle is further configured to: receive camera data from the respective external vehicle camera, determine a light intensity measurement based on the camera data, and compare the lumen measurement with the light intensity measurement to generate a comparison, wherein estimating the thickness of the ice and the snow on the respective vehicle roof includes estimating a thickness of the ice and the snow on the respective vehicle based in part on the comparison.

Example 20 provides a method, system, and/or vehicle according to any of the preceding and/or following examples, wherein the respective ice and snow detectors are further configured to: communicate the determination of the accumulation of ice and snow on the respective vehicle with the central computer, and receive the baseline measurements from the central computer.

Example 20 provides a method, system, and/or vehicle according to any of the preceding and/or following examples, further comprising a thermocouple for determining a temperature measurement, wherein the temperature measurement can be used to identify a possibility of a presence of ice and snow.

Example 22 includes a vehicle comprising means for performing the method of any of the examples 1-20.

Example 23 provides that a method of any of examples 1-21 is a computer-implemented method.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

What is claimed is:

1. A vehicle comprising:
   an inertial measurement unit (IMU) configured to generate IMU data, wherein the IMU includes at least one IMU accelerometer and a gyroscope;
   an external light sensor;
   a plurality of embedded accelerometers configured to generate accelerometer data; and
   an ice detector configured to:
   receive the accelerometer data and the IMU data;
   identify a chassis response based on the accelerometer data and the IMU data;
   determine a weight of ice on the vehicle based on the chassis response; and
   determine an accumulation of ice on the vehicle based on the weight determination;
   receive light sensor data from the external light sensor,
   determine a lumen measurement based on the light sensor data, and
   estimate a thickness of ice on the vehicle roof based on the lumen measurement.

2. The vehicle of claim 1, further comprising an external vehicle camera, and wherein the ice detector is further configured to:
   receive camera data from the external vehicle camera,
   determine a light intensity measurement based on the camera data, and
   compare the lumen measurement with the light intensity measurement to generate a comparison,
   wherein estimating the thickness of the ice on the vehicle roof includes estimating a thickness of the ice on the vehicle based in part on the comparison.

3. The vehicle of claim 1, wherein the ice detector is further configured to communicate the determination of the accumulation of ice on the vehicle with a central computer.

4. The vehicle of claim 3, wherein the ice detector is further configured to receive baseline measurements from the central computer, wherein the baseline measurements include a baseline ambient light measurement.

5. The vehicle of claim 1, further comprising an external microphone, and an acoustic processing module, wherein the acoustic processing module is configured to receive microphone data and determine a sound attenuation measurement, and wherein the ice detector is further configured to:
   receive the sound attenuation measurement, and
   detect the accumulation of ice based, in part, on the attenuation measurement.

6. A method for detection of ice accumulation on a vehicle comprising:
   an ice detector having a processor and a memory, the memory having instructions to operate the processor for:
   receiving inertial measurement data generated by an inertial measurement unit (IMU) of the vehicle, wherein the IMU includes at least one IMU accelerometer and a gyroscope;
   receiving accelerometer data generated by the IMU accelerometer;
   determining IMU measurements including a linear velocity and an angular rate from the IMU data;
   determining an acceleration measurement based on the accelerometer data;
   determining a chassis response of a chassis of the vehicle based on the IMU measurements and the acceleration measurement;
   estimating a mass of the ice on the vehicle based on the chassis response;
   detecting the ice accumulation based on the estimated mass of the ice;
   receiving light sensor data from an external vehicle light sensor;
   determining a lumen measurement based on the light sensor data; and
   estimating a thickness of the ice accumulation on the vehicle based on the lumen measurement.

7. The method of claim 6, wherein the lumen measurement is a first lumen measurement and further comprising:
   capturing camera data with an external vehicle camera;
   determining a second lumen measurement based on the camera data; and
   comparing the first lumen measurement with the second lumen measurement to generate a comparison; and
   wherein estimating the thickness of the ice on the vehicle includes estimating a thickness of the ice on the vehicle based in part on the comparison.

8. The method of claim 7, wherein receiving light sensor data includes receiving first light sensor data at a first time, receiving accelerometer data includes receiving first accelerometer data at the first time, and receiving inertial measurement data includes receiving first inertial measurement data at the first time, wherein the lumen measurement is a first lumen measurement, the acceleration measurement is a first acceleration measurement, and the IMU measurements are first IMU measurements, and further comprising:
   monitoring the ice accumulation to identify a rate of the ice accumulation, wherein monitoring includes receiving, at a second time, second light sensor data, second accelerometer data, and second inertial measurement data, and determining a change in the ice accumulation between the first time and the second time.

9. The method of claim 6, further comprising communicating the ice accumulation, including the estimated mass and the estimated thickness, with a central computer.

10. The method of claim 9, further comprising receiving a baseline lumen measurement from the central computer and receiving a baseline mass measurement, wherein the baseline lumen measurement and the baseline mass measurement are based on fleet data.

11. The method of claim 6, wherein detecting the ice accumulation includes at least one of:
   determining the estimated mass of the ice exceeds a selected mass threshold, and determining the estimated thickness of the ice exceeds a selected thickness threshold.

12. The method of claim 6, further comprising receiving audio data from an external vehicle microphone, and identifying attenuation based on the audio data, and wherein detecting the ice accumulation further including detecting the ice accumulation based on the attenuation.

13. The method of claim 6, further comprising utilizing a machine learning model for detecting the ice accumulation.

14. The method of claim 13, further comprising utilizing the machine learning model for estimating the thickness of the ice accumulation.

15. A system for detection of ice accumulation on a vehicle, comprising:
   a plurality of vehicles, each vehicle including:
   a respective inertial measurement unit (IMU) configured to generate IMU data, wherein the IMU includes at least one IMU accelerometer and a gyroscope;
   a respective plurality of embedded accelerometers configured to generate accelerometer data; and
   a respective ice detector configured to:
   receive the accelerometer data and the IMU data, identify a respective chassis response based on the accelerometer data and the IMU data;
   determine a weight of ice on the vehicle based on the respective chassis response; and
   determine an accumulation of ice on the respective vehicle based on the weight determination; and
   a central computer in communication with each of the plurality of vehicles, and configured to generate baseline measurements for ice detection.

16. The system of claim 15, wherein each of the plurality of vehicles further includes a respective external light sensor, wherein the respective external light sensor is located on a respective vehicle roof, and wherein the respective ice detector is further configured to:
   receive light sensor data from the respective external light sensor,
   determine a lumen measurement based on the light sensor data, and
   estimate a thickness of ice on the respective vehicle roof based on the lumen measurement.

17. The system of claim 16, wherein each of the plurality of vehicles further includes a respective external vehicle camera, and wherein the respective ice detector in each respective vehicle is further configured to:
   receive camera data from the respective external vehicle camera,
   determine a light intensity measurement based on the camera data, and
   compare the lumen measurement with the light intensity measurement to generate a comparison,
   wherein estimating the thickness of the ice on the respective vehicle roof includes estimating a thickness of the ice on the respective vehicle based in part on the comparison.

18. The system of claim 16, wherein the respective ice detectors are further configured to:
   communicate the determination of the accumulation of ice on the respective vehicle with the central computer, and
   receive the baseline measurements from the central computer.

* * * * *